(12) United States Patent
Rudisi et al.

(10) Patent No.: US 6,365,276 B1
(45) Date of Patent: Apr. 2, 2002

(54) COATED METAL ARTICLES METHODS FOR PREPARING THE SAME LAMINATED COMPOSITES CONTAINING THE SAME, AND METHODS FOR PREPARING SUCH LAMINATED COMPOSITES

(75) Inventors: Joseph J. Rudisi, Virginia Beach; Richard N. Harford; Frederick L. Chapman, both of Chesapeake; Hari Menon, Yorktown, all of VA (US); Tetsu Sonoda, Inzai (JP)

(73) Assignee: Mitsushita Chemical America, Inc., Chesapeake, VA (US)

( * ) Notice: Subject to any disclaimer, the term of this patent is extended or adjusted under 35 U.S.C. 154(b) by 0 days.

(21) Appl. No.: 09/438,424

(22) Filed: Nov. 12, 1999

(51) Int. Cl.[7] .................. B32B 27/06; B32B 27/18; B32B 27/30
(52) U.S. Cl. ............. 428/412; 428/421; 428/457; 428/458; 428/461; 428/463; 427/318; 427/377; 427/409
(58) Field of Search .................. 428/412, 421, 428/457, 458, 461, 463; 427/318, 327, 409

(56) References Cited

U.S. PATENT DOCUMENTS

| | | | | |
|---|---|---|---|---|
| 5,178,915 A | * | 1/1993 | Moyle et al. | 427/318 |
| 5,252,383 A | * | 10/1993 | Fukutake | 428/209 |
| 5,366,803 A | * | 11/1994 | Nakazawa et al. | 428/335 |
| 5,919,878 A | * | 7/1999 | Brothers | 526/247 |
| 6,117,555 A | * | 9/2000 | Fujimori | 428/421 |
| 6,153,303 A | * | 11/2000 | Namura | 428/421 |
| 6,300,445 B1 | * | 10/2001 | Hung | 526/248 |

* cited by examiner

*Primary Examiner*—Leszek Kiliman
(74) *Attorney, Agent, or Firm*—Oblon, Spivak, McClelland, Maier & Neustadt, P.C.

(57) ABSTRACT

Coating the surface of metal articles, in particular untreated, bright, sealed, anodized metal sheets, especially bright, sealed, anodized aluminum sheets with a coating composition which contains:

(a') a fluorinated ethylene vinyl ether;
(b') a curing agent;
(c') a catalyst; and
(d') a solvent, followed by curing affords metals articles which are particularly useful as components of metal-resin composite laminates.

31 Claims, 3 Drawing Sheets

COATED METAL ARTICLES METHODS FOR PREPARING THE SAME LAMINATED COMPOSITES CONTAINING THE SAME, AND METHODS FOR PREPARING SUCH LAMINATED COMPOSITES

BACKGROUND OF THE INVENTION

1. Field of the Invention

The present invention relates to novel coated metal articles, in particular coated, untreated, bright, sealed, anodized metal sheets, especially coated bright, sealed, anodized aluminum sheets. The present invention also relates to methods for coating metal articles, in particular untreated, bright, sealed, anodized metal sheets, especially bright, sealed, anodized aluminum sheets. The present invention further relates to laminated composites which contain such a coated metal article, and methods for preparing such laminated composites.

2. Discussion of the Background

Unsealed metal substrates which have been anodized by an electrochemical process employing sulfuric acid, chromic acid, phosphoric acid, or oxalic acid electrolytes, provide an excellent base for adhesion of a paint, enamel or lacquer coating because of the porosity of the anodized metal surface. Clear methacrylate lacquers are known to be useful to paint such unsealed, anodized metal surfaces to provide a high gloss coating.

However, anodized metal substrates are often sealed when it is desired to employ the metal in an environment where the porosity of the anodized metal is undesirable, such as for example when used in auto trim parts where exposure to the elements can result in corrosion or staining of the metal. Sealing of such anodized metal substrates, such as by immersion in boiling deionized water, sodium bichromate, nickel acetate solutions, or steam, makes the anodized coating on the metal nonabsorptive by closing down or plugging the pore structure of the anodized coating. When anodized metal substrates have been sealed, it is very difficult for paint or a coating to adhere to the surface of the sealed, anodized metal substrate, particularly untreated bright, sealed, anodized metal substrates, even more particularly untreated, bright, sealed, anodized aluminum substrates.

U.S. Pat. No. 5,178,915 discloses the coating of untreated, bright, sealed anodized metals such as aluminum coils, with a catalyst-free coating composition, which contains a high gloss, thermosetting, hydroxyl group-containing fluorocarbon polymer (such as a fluorinated ethylene vinyl ether, FEVE), a crosslinking agent, a solvent, an ultraviolet screening agent, and an ultraviolet stabilizer. However, the coating of U.S. Pat. No. 5,178,915 specifically excludes inclusion of a catalyst to impart the necessary properties. In addition, U.S. Pat. No. 5,178,915 uses very high temperatures (>450° F.) both for the coil coating and curing processes.

U.S. Pat. No. 5,366,803 discloses metal sheets having a layer of cured polyvinylidene fluoride (PVDF) paint on the metal surface and a layer of cured FEVE on the cured layer of PVDF and laminated composites prepared from such metal sheets. However, it is desirable that coatings provide a mirrored finish with a high gloss, i.e. produce at least 99 percent reflectance, and the coatings of U.S. Pat. No. 5,366,803 have a gloss of only 25 to 80%.

Various composite laminates are known wherein a metal sheet is laminated on a thermoplastic synthetic resin sheet. U.S. Pat. No. 4,508,425 discloses a mirror manufactured by plating chromium on one surface of a metal sheet which bonded to a synthetic resin sheet, to form a mirror surface. The mirrored-finish sheet may be worked to a desired shape and may be formed with a decorative pattern U.S. Pat. No. 4,560,623 discloses a specular product of bronze-like tone particularly suitable for use as a decorative material. The specular product uses, as a substrate, a composite comprising a synthetic resin sheet and metal sheets laminated thereon, and includes a nickel deposit plated on the metal sheet and a specular film of Sn—Ni alloy electroplated on the nickel deposit using a specific electroplating bath.

Such laminates are useful for a number of architectural applications, because the laminates combine light weight with high strength. These laminates may be used as finished surfaces for all or some portions of the interior or exterior surfaces of a building.

However, when metal sheets are coated with conventional polyvinylidene fluoride (PVDF) paints, the coated plates exhibit a phenomenon known as heat blocking upon subsequent lamination with a resin layer. This heat blocking phenomenon seriously detracts from the aesthetic appeal of the finished plate. In addition, use of conventional PVDF paints results in coatings which have a gloss within a fairly narrow range, 25 to 35%.

Thus, there remains a need for coated metal articles, in particular coated untreated, bright, sealed, anodized metal sheets, especially coated bright, sealed, anodized aluminum sheets, which overcome the above-described deficiencies. There also remains a need for coated metal sheets with a high degree of gloss or reflectance, which do not experience heat blocking on lamination, which exhibit excellent weathering resistance, and which are able to be bent to a sharp angle without cracking of the coating on the exposed metal surface. There also remains a need for laminates which contain such a coated metal sheet. There also remains a need for methods for preparing such coated metal articles and such laminates.

SUMMARY OF THE INVENTION

Thus, it is one object of the present invention to provide novel coated metal articles.

It is another object of the present invention to provide novel coated untreated, bright, sealed, anodized metal sheets.

It is another object of the present invention to provide novel coated untreated, bright, sealed, anodized metal sheets in coil form.

It is another object of the present invention to provide novel coated untreated, bright, sealed, anodized aluminum sheets.

It is another object of the present invention to provide novel coated untreated, bright, sealed, anodized aluminum sheets in coil form.

It is another object of the present invention to provide novel coated metal articles, which exhibit a high gloss.

It is another object of the present invention to provide novel coated untreated, bright, sealed, anodized metal sheets, which exhibit a high gloss.

It is another object of the present invention to provide novel coated untreated, bright, sealed, anodized metal sheets, which exhibit a high gloss, in coil form.

It is another object of the present invention to provide novel coated untreated, bright, sealed, anodized aluminum sheets, which exhibit a high gloss.

It is another object of the present invention to provide novel coated untreated, bright, sealed, anodized aluminum sheets, which exhibit a high gloss, in coil form.

It is another object of the present invention to provide novel coated metal articles, which exhibit a high reflectance.

It is another object of the present invention to provide novel coated untreated, bright, sealed, anodized metal sheets, which exhibit a high reflectance.

It is another object of the present invention to provide novel coated untreated, bright, sealed, anodized metal sheets, which exhibit a high reflectance, in coil form.

It is another object of the present invention to provide novel coated untreated, bright, sealed, anodized aluminum sheets, which exhibit a high reflectance.

It is another object of the present invention to provide novel coated untreated, bright, sealed, anodized aluminum sheets, which exhibit a high reflectance, in coil form.

It is another object of the present invention to provide novel coated metal articles, which exhibit a reflectance of at least 87% or a gloss rating of at least 99%.

It is another object of the present invention to provide novel coated untreated, bright, sealed, anodized metal sheets, which exhibit a reflectance of at least 87% or a gloss rating of at least 99%.

It is another object of the present invention to provide novel coated untreated, bright, sealed, anodized metal sheets, which exhibit a reflectance of at least 87% or a gloss rating of at least 99%, in coil form.

It is another object of the present invention to provide novel coated untreated, bright, sealed, anodized aluminum sheets, which exhibit a reflectance of at least 87% or a gloss rating of at least 99%.

It is another object of the present invention to provide novel coated untreated, bright, sealed, anodized aluminum sheets, which exhibit a reflectance of at least 87% or a gloss rating of at least 99%, in coil form.

It is another object of the present invention to provide novel coated metal articles, which exhibit a reflectance of at least 87% or a gloss rating of at least 99%.

It is another object of the present invention to provide novel coated untreated, bright, sealed, anodized metal sheets, which exhibit a reflectance of at least 87% or a gloss rating of at least 99%.

It is another object of the present invention to provide novel coated untreated, bright, sealed, anodized metal sheets, which exhibit a reflectance of at least 87% or a gloss rating of at least 99%, in coil form.

It is another object of the present invention to provide novel coated untreated, bright, sealed, anodized aluminum sheets, which exhibit a reflectance of at least 87% or a gloss rating of at least 99%.

It is another object of the present invention to provide novel coated untreated, bright, sealed, anodized aluminum sheets, which exhibit a reflectance of at least 87% or a gloss rating of at least 99%, in coil form.

It is another object of the present invention to provide novel coated metal articles, whereby the resulting coating has sufficient integrity and adhesion to the metal article, to allow post-coating fabrication of the coated metal article into a laminate, particularly a laminate for use as a building panel.

It is another object of the present invention to provide novel coated untreated, bright, sealed, anodized metal sheets, whereby the resulting coating has sufficient integrity and adhesion to the metal article, to allow post-coating fabrication of the coated metal article into a laminate, particularly a laminate for use as a building panel.

It is another object of the present invention to provide novel coated untreated, bright, sealed, anodized metal sheets in coil form, whereby the resulting coating has sufficient integrity and adhesion to the metal article, to allow post-coating fabrication of the coated metal article into a laminate, particularly a laminate for use as a building panel.

It is another object of the present invention to provide novel coated untreated, bright, sealed, anodized aluminum sheets, whereby the resulting coating has sufficient integrity and adhesion to the metal article, to allow post-coating fabrication of the coated metal article into a laminate, particularly a laminate for use as a building panel.

It is another object of the present invention to provide novel coated untreated, bright, sealed, anodized aluminum sheets in coil form, whereby the resulting coating has sufficient integrity and adhesion to the metal article, to allow post-coating fabrication of the coated metal article into a laminate, particularly a laminate for use as a building panel.

It is another object of the present invention to provide novel coated metal articles, which exhibit good weathering resistance and are able to be bent to a sharp angle without cracking of the coating on the exposed surface of the metal.

It is another object of the present invention to provide novel coated untreated, bright, sealed, anodized metal sheets, which exhibit good weathering resistance and are able to be bent to a sharp angle without cracking of the coating on the exposed surface of the metal.

It is another object of the present invention to provide novel coated untreated, bright, sealed, anodized metal sheets, which exhibit good weathering resistance and are able to be bent to a sharp angle without cracking of the coating on the exposed surface of the metal, in coil form.

It is another object of the present invention to provide novel coated untreated, bright, sealed, anodized aluminum sheets, which exhibit good weathering resistance and are able to be bent to a sharp angle without cracking of the coating on the exposed surface of the metal.

It is another object of the present invention to provide novel coated untreated, bright, sealed, anodized aluminum sheets, which exhibit good weathering resistance and are able to be bent to a sharp angle without cracking of the coating on the exposed surface of the metal, in coil form.

It is another object of the present invention to provide novel coated metal articles, which exhibit sufficient stability and integrity to resist corrosion, hazing, cloudiness, flaking, cracking, mottling and/or delamination of the coating when exposed to environmental factors such as smog, ultraviolet light, ozone, and excessive heat and cold, and abrasive cleaning solutions.

It is another object of the present invention to provide novel coated untreated, bright, sealed, anodized metal sheets, which exhibit sufficient stability and integrity to resist corrosion, hazing, cloudiness, flaking, cracking, mottling and/or delamination of the coating when exposed to environmental factors such as smog, ultraviolet light, ozone, and excessive heat and cold, and abrasive cleaning solutions.

It is another object of the present invention to provide novel coated untreated, bright, sealed, anodized metal sheets in coil form, which exhibit sufficient stability and integrity to resist corrosion, hazing, cloudiness, flaking, cracking, mottling and/or delamination of the coating when exposed to environmental factors such as smog, ultraviolet light, ozone, and excessive heat and cold, and abrasive cleaning solutions.

It is another object of the present invention to provide novel coated untreated, bright, sealed, anodized aluminum sheets, which exhibit sufficient stability and integrity to resist corrosion, hazing, cloudiness, flaking, cracking, mottling and/or delamination of the coating when exposed to environmental factors such as smog, ultraviolet light, ozone, and excessive heat and cold, and abrasive cleaning solutions.

It is another object of the present invention to provide novel coated untreated, bright, sealed, anodized aluminum sheets in coil form, which exhibit sufficient stability and integrity to resist corrosion, hazing, cloudiness, flaking, cracking, mottling and/or delamination of the coating when exposed to environmental factors such as smog, ultraviolet light, ozone, and excessive heat and cold, and abrasive cleaning solutions.

It is another object of the present invention to provide a novel composite laminates which contains such a coated metal article, in particular such a coated, untreated, bright, sealed, anodized metal sheet, especially such a coated bright, sealed, anodized aluminum sheet.

It is another object of the present invention to provide novel composite laminates which contain a coated metal sheet and which may be bent to a sharp angle without cracking of the coating.

It is another object of the present invention to provide novel composite laminates which contain a coated metal sheet, in which the exposed metal sheet exhibits a reflectance of at least 87% or a gloss rating of at least 99%.

It is another object of the present invention to provide novel composite laminates which contain a coated metal sheet, in which the exposed metal sheet exhibits a reflectance of at least 87% or a gloss rating greater than 99%.

It is another object of the present invention to provide novel composite laminates which contain a coated metal sheet, which exhibits excellent weathering resistance.

It is another object of the present invention to provide novel methods for preparing such coated metal articles.

It is another object of the present invention to provide novel methods for preparing such composite laminates These and other objects, which will become apparent during the following detailed description, have been achieved by the inventors' discovery that coated metal articles, comprising:

(a) a metal substrate with a surface; and
(b) a layer of a cured fluorinated ethylene vinyl ether paint on said surface,
   wherein said layer of cured fluorinated ethylene vinyl ether paint is formed by coating said surface with a coating composition which comprises:
   (a') a fluorinated ethylene vinyl ether;
   (b') a curing agent;
   (c') a catalyst; and
   (d') a solvent,
and curing said coating composition, achieve the forgoing objectives.

The inventors have also discovered that such coated metal articles may be prepared by a method comprising the steps:

(1) coating a surface of the metal article with a coating composition which comprises:
   (a') a fluorinated ethylene vinyl ether;
   (b') a curing agent;
   (c') a catalyst; and
   (d') a solvent, to obtain an uncured coating layer and
(2) curing said uncured coating layer.

The inventors have also discovered that metal-resin composite laminates comprising:

(A) a resin sheet; and
(B) a first metal sheet laminated on a first surface of said resin sheet;
   wherein said first metal sheet is a coated metal sheet comprising:
   (a) a metal substrate with an interior and exterior surface; and
   (b) a layer of a cured fluorinated ethylene vinyl ether paint on said exterior surface opposite said resin sheet,
      wherein said layer of cured fluorinated ethylene vinyl ether paint is formed by coating said exterior surface with a coating composition which comprises:
      (a') a fluorinated ethylene vinyl ether;
      (b') a curing agent;
      (c') a catalyst; and
      (d') a solvent,
   and curing said coating composition,
achieve the above-mentioned objectives.

The inventors have also discovered that such metal-resin composite laminates may be prepared by a process comprising:

(1) forming a layer of a coating composition on a metal surface; and
(2) curing said layer of said coating composition, to obtain a coated metal sheet; and
(3) laminating said coated metal sheet to a resin sheet,
   wherein said coating composition comprises:
   (a') a fluorinated ethylene vinyl ether;
   (b') a curing agent;
   (c') a catalyst; and
   (d') a solvent.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
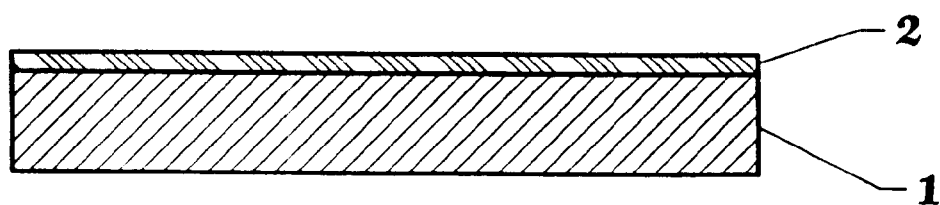
FIG. 1 provides a cross-sectional view of the coated metal sheet of the present invention.

Thus, in a first embodiment, the present invention provides novel coated metal articles, which comprising:

(a) a metal substrate with a surface; and
(b) a layer of a cured fluorinated ethylene vinyl ether paint on said surface,
   wherein said layer of cured fluorinated ethylene vinyl ether paint is formed by coating said surface with a coating composition which comprises:
   (a') a fluorinated ethylene vinyl ether;
   (b') a curing agent;
   (c') a catalyst; and
   (d') a solvent,
and curing said coating composition.

The metal substrate may be formed of any of various metals such as aluminum, iron, copper, tin, steel, and the like. Aluminum and iron are preferred, and aluminum is particularly preferred. In a particularly preferred embodiment, the metal substrate is an untreated, bright, sealed, anodized metal sheet. In an even more particularly preferred embodiment, the metal substrate is an bright, sealed, anodized aluminum sheet. Most preferably, the metal substrate is a coil of bright, sealed, anodized aluminum.

Although there is no particular constraint on the shape or thickness of the metal substrate, if the coated metal article is to be used as a component in a composite laminate, it is preferred that the substrate be in the form of a sheet and have a thickness of 0.01 to 2 mm, most preferably 0.1 to 0.8 mm. The sheet can have any desired width depending on the equipment used to handle the sheets. Preferably, the sheet is a continuous 4 ft. wide sheet. The resulting product can be later cut into desired lengths, with 8 ft length sheets being preferred. In a particularly preferred embodiment the metal substrate exists as a coil of metal sheet.

In a preferred embodiment, the metal sheet, in particular aluminum sheet, is primed on one or more surfaces. If the metal sheet is to be used in a laminate with a resin core such as a polyolefin, then the surface of the metal sheet to be bonded to the resin core is preferably primed with an epoxy coating. Good results have been achieved using an epoxy primer.

Suitably, the thickness of the cured FEVE paint is 1 to 40 μm, preferably 12 to 25 μm. If the thickness of the FEVE coat is less than 1 μm then the necessary effects of the present invention, such as high gloss and reduced blocking may not be achieved. If the thickness of the coat is greater than 40 μm then the coat may crack on bending of the metal plate.

The coated metal article of the present invention may be prepared by a method comprising the steps:

(1) forming a layer of a coating composition on a metal surface; and (2) curing said layer of said coating composition,
   wherein said coating composition comprises:
   (a') a fluorinated ethylene vinyl ether;
   (b') a curing agent;
   (c') a catalyst; and
   (d') a solvent.

The fluorinated ethylene vinyl ether (FEVE) may be any of those disclosed in U.S. Pat. No. 4,345,057, which is incorporated herein by reference. FEVE is a copolymer of a fluoroolefin, cyclohexyl vinyl ether, and a hydroxylalkyl vinyl ether. The copolymer of fluoroolefin, cyclohexyl vinyl ether, and hydroxyalkyl vinyl has the general structure shown below:

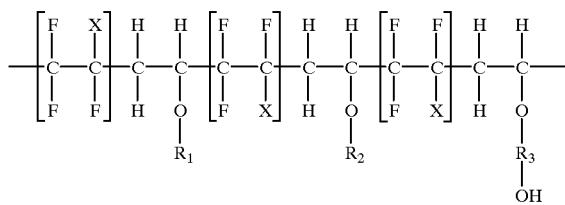

wherein X is Cl or F, $R_1$ and $R_2$ are independently $C_{2-8}$alkyl or $C_6$ cycloalkyl; and $R_3$ is $C_{2-8}$alkylene $C_6$ cycloalkylene. The copolymer may also contain repeating units of the formula:

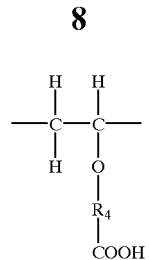

wherein $R_4$ is $C_{2-8}$alkylene or $C_6$cycloalkylene.

The hydroxyl group-containing thermosetting fluorocarbon polymers employed in the coating compositions of this invention are basically amorphous, alternating thermosetting polymers of a fluoroolefin and several specific vinyl monomers. Such polymers are produced from fluoroolefins such as tetrafluoroethylene or chlorotrifluoroethylene and vinyl monomers such as an alkylvinyl ether, for example ethyl, butyl or cyclohexyl vinyl ethers, and a hydroxyvinyl ether such as 2-hydroxyethyl vinyl ether. Optionally said hydroxy group-containing fluoropolymer is reacted with a dibasic acid anhydride such as succinic anhydride to provide carboxy functionality in the polymer. A process for the preparation of such polymers is disclosed in U.S. Pat. No. 4,487,893 assigned to Asahi Glass Company, Ltd.

The present coating compositions will typically contain the FEVE in an amount of from 15 to 50 wt. %, preferably 20 to 40 wt. %, most preferably 20 to 25 wt % for white pigmented FEVE and from 30 to 35 wt. % for clear unpigmented FEVE, based on the total weight of the coating composition. For the clear unpigmented FEVE the composition is typically 34 wt % FEVE with 7 wt % crosslinking agent and 4 wt % other additives, and 55 wt % of binder and solvent, which includes 0.03 wt % of catalyst. For the white pigmented FEVE, the composition is typically 22 wt % FEVE with 7 wt % crosslinking agent, 23 wt % of pigment and 53 wt % of binder and solvent, including 0.015–0.02 wt % of catalyst.

The present coating compositions also contain a curing agent. Suitable curing agents include melamine resins, urea resins, polybasic acids, blocked aliphatic polyisocyanates, partially self-condensing highly methylated melamine-formaldehyde resins or mixtures of the blocked polyisocyanate and melamine-formaldehyde resin.

Preferred cross-linking agents include either a blocked aliphatic polyisocyanate, a partially self-condensing, highly methylated melamine-formaldehyde resin or a mixture thereof. Useful as the blocked aliphatic polyisocyanate component is a methyl ethyl ketoxime blocked hexamethylene diisocyanate trimer (an isocyanurate group-containing polyisocyanate prepared from hexamethylene diisocyanate blocked with methyl ethyl ketosime), such as Desmodur BL 3175A available from Mobay Chemical Corp. which is sold as a 75% solids in Aromatic S-100 solvent.

The coating compositions will typically contain the curing agent in an amount of 5 to 9 wt. %, preferably about 7 wt. %, based on the total weight of the coating composition.

The coating composition also contains a solvent such as hydrocarbons, alcohols, esters, ketones, glycol ethers, and various commercial thinners, including but not limited to cyclohexanol, Solvesso 150 and similar commercially available solvents. The present coating compositions will typically contain the solvent in an amount of 40 to 60 wt. %, preferably 50 to 55 wt. %, based on the total weight of the coating composition.

The coating composition also contains a catalyst. In the past, the presence of a catalyst has been known to lead to kick out (forming of seeds or crystals) or gelling of the resin composition with a significant viscosity increase which can even lead to solidification if not adequately dosed. Another drawback that had been found to exist with the use of a catalyst was the formation of haze in the resin compositions in both the liquid and dry state. In the present coating compositions, the use of a catalyst that controls these heretofore negative drawbacks is desirable and necessary. Accordingly, the catalyst contained in the present coating composition is an organic tin compound, preferably a di-$C_1$–$C_6$-alkyl tin diester, most preferably dibutyl tin dilaurate.

The coating compositions will typically contain the catalyst in an amount of from 0.01 to 0.03 wt. %, based on total weight of the composition, depending on the type of coating composition, pigmented or unpigmented. For white pigmented coating compositions, the catalyst is preferably in an amount of from 0.015 to 0.02 wt. %, based on the total weight of the coating composition. For clear unpigmented coating compositions, the catalyst is preferably in an amount from 0.02 to 0.03 wt %, most preferably 0.03 wt %, based on total weight of the composition.

The coating compositions may be prepared by simply mixing components (a), (b), (c), and (d) in the appropriate amounts. Alternatively, the catalyst (d) may be added to a preformed mixture of components (a), (b), and (c). Such mixtures are known in the art as FEVE paints. Such FEVE paints are known in the art as Lumiflon Paints, and good results have been achieved using commercially available paints sold under the tradename of BONN-FLON® manufactured by Asahi Glass Coat & Resin Co., Ltd. in Japan and tradename MEGAFLON® manufactured by PPG & SimularLumiflon Resin Based Paints.

Typically, the FEVE paint will not contain a pigment and will instead form a clear, colorless layer over most metal substrates.

The layer of the coating composition may be applied by any conventional technique, such as brushing, spraying, rolling, dipping, etc. It is preferred that the FEVE coating be applied by die-roll coating.

The layer of the coating composition is cured by baking at a temperature of 380 to 450° F. (peak metal temperature-PMT), preferably at least 400° to 420° F. or above, and not higher than 450° F.

Although the metal sheets coated with cured FEVE according to the present invention may be used as a final product, for fabricating metal articles, more typically, the coated metal sheet of the present invention will be laminated with a resin layer to form a composite laminate. Thus, in another embodiment, the present invention provides metal-resin composite laminates comprising:

(A) a resin sheet; and
(B) a first metal sheet laminated on a first surface of said resin sheet;
  wherein said first metal sheet is a coated metal sheet comprising:
  (a) a metal substrate with an interior and exterior surface; and
  (b) a layer of a cured fluorinated ethylene vinyl ether paint on said exterior surface opposite said resin sheet,
  wherein said layer of cured fluorinated ethylene vinyl ether paint is formed by coating said exterior surface with a coating composition which comprises:
  (a') a fluorinated ethylene vinyl ether;
  (b') a curing agent;
  (c') a catalyst; and
  (d') a solvent,
and curing said coating composition.

Also, although it may sometimes be desirable to use only one metal sheet coated with FEVE according to the present invention, the final laminate may also comprise a resin sandwiched between two metal sheets, each of which having the surface not bonded to the resin core coated with FEVE according to the present invention.

The resin core may be composed of any resin suitable for use in metal resin laminate plates. Such resins are described in U.S. Pat. No. 4,994,130, which is incorporated herein by reference. It includes, for example, polyethylene, polypropylene, polybutane, polyvinyl chloride, polystyrene, polyamide, polyethylene terephthalate, polybutylene terephthalate and polycarbonate. From the viewpoint of the extrusion molding properties, it is preferred to employ a polyolefin synthetic resin such as polyethylene, polypropylene, or polybutene. As such a thermoplastic resin, not only a virgin material, but also a recovered material or reproduced material may be used in the form of a sheet. To such a thermoplastic resin, a foaming agent, a flame retardant, a filler, a coloring agent, etc. may be incorporated as the case requires. Good results have been achieved by using a low density polyethylene core.

It is particularly preferred that the metal sheet(s) be laminated with the resin core by means of an adhesive laminating film, disposed between the resin core and the metal sheet. Most preferably, the adhesive film is a modified polyolefin resin such as those described in U.S. Pat. No. 4,762,882, which is incorporated herein by reference.

Suitably, the resin core is 1 to 10 mm thick, preferably 2 to 5 mm thick. The adhesive film is suitably 10 to 100 μm thick, preferably 15 to 50 μm thick.

The laminate of the present invention may be prepared by extruding the resin core through a die to form a flat sheet and passing the extruded resin sheet through laminating rollers simultaneously with two metal sheets, one on each surface of the resin sheet. At least one and sometimes both of the metal sheets are coated according to the present invention. The metal sheets according to the present invention are oriented such that the FEVE layers face away from the resin core.

Typically, the resin core is laminated at a temperature of 110° to 190° F., preferably 125° to 165° F. It is preferred to extrude the resin sheet to a thickness which is larger than the gap between the laminating rollers by about 10%. Preferably, the coated metal sheet is preheated to a temperature of 320° to 420° F., most preferably 330° to 400° F. before passing through the laminating rollers with the resin core. The lamination is suitably carried out at a temperature of 320° to 410° F. Suitably, the laminating pressure is 250 to 1100 psi, preferably 400 to 1000 psi.

In a preferred embodiment, the coated metal plate is laminated to the resin core by an adhesive film. In this case, a multilayered arrangement, in which the adhesive film is disposed between the metal sheet and the resin core, is forced through the laminating rollers.

In another preferred embodiment, the cured FEVE surface of the final laminate is covered with a protective film to prevent marring of the surface during stacking and shipping. Suitably, the protective film is any lightly adhesive film which will sufficiently protect the surface of the laminate and can be easily removed. Good results have been achieved with QUALITY COTE® produced by Main Tape of Union, N.J.

Referring now to the drawings, wherein like reference numerals designate identical or corresponding parts throughout the several views, FIG. 1 shows a cross-sectional view of a coated metal plate according to the present invention. The metal substrate (1) which is coated with a cured layer of FEVE coating (2) to produce a mirror-like finish suitable for outdoor building panels.

Figure 2:
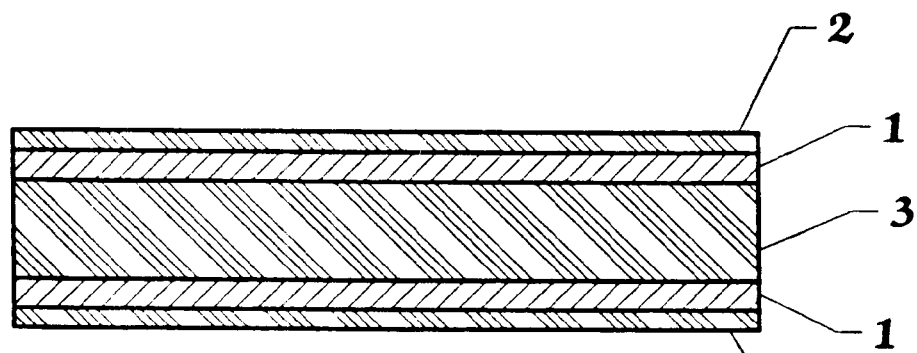
FIG. 2 provides a cross-sectional view of the metal-resin composite laminate of the present invention.

FIG. 2 shows a cross-sectional view of a metal-resin composite laminate of the present invention. Therein core (3) is sandwiched between two coated metal sheets according to the present invention each of which comprise a metal substrate (1) and a cured layer of FEVE paint (2).

The coated metal sheets are oriented such that the cured layers (2) face away from the resin core (3). Although the embodiment shown has two coated metal sheets of the present invention, it is to be understood that other embodiments will employ only one of the present coated metal sheets.

Figure 3:
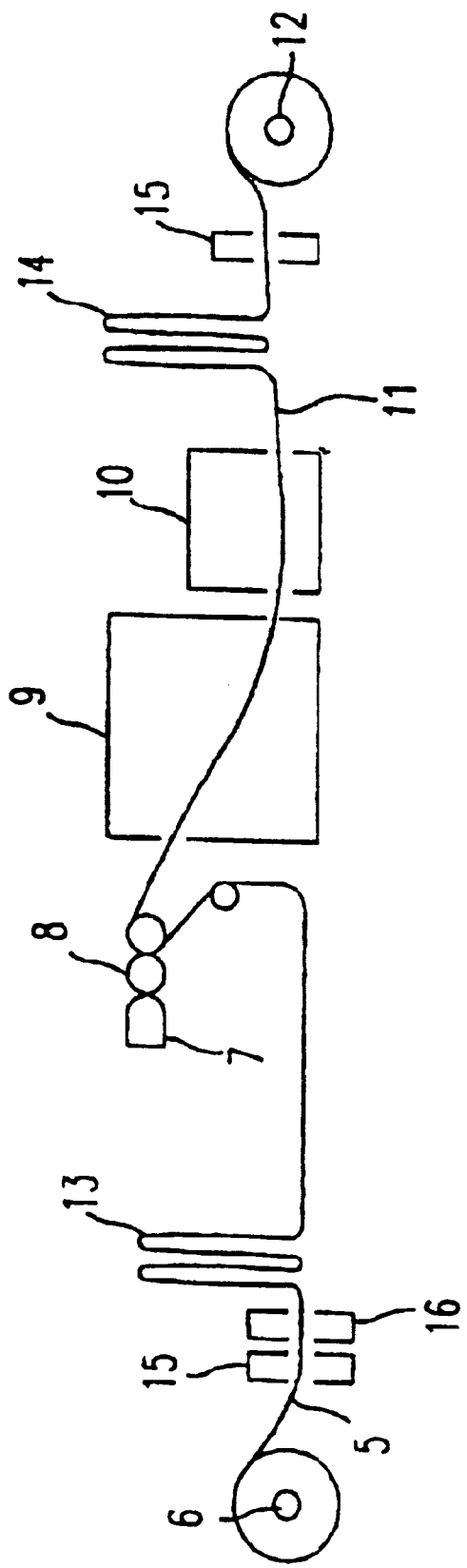
FIG. 3 illustrates an apparatus for forming the coated metal plates of the present invention.

FIG. 3 schematically illustrates an apparatus used for forming the coated metal sheet of the present invention. The structure and operation of the apparatus will be discussed in terms of the formation of the cured FEVE paint layer. The metal sheet (5) is uncoiled from a feed roll by means of an uncoiler (6) and the paint is applied by means of die-roll coating using a die (7) and roller (8). The FEVE paint is cured by baking in an oven (9) and cooled in a cooler (10). The cured and cooled coated (11) sheet is taken up on a product roll by means of a recoiler (12). The apparatus is equipped with an entrance accumulator (13) and an exit accumulator (14) as well as entrance and exit shears (15) and an entrance joiner (16) to facilitate removal and replacement of empty feed rolls and full product rolls.

Figure 4:
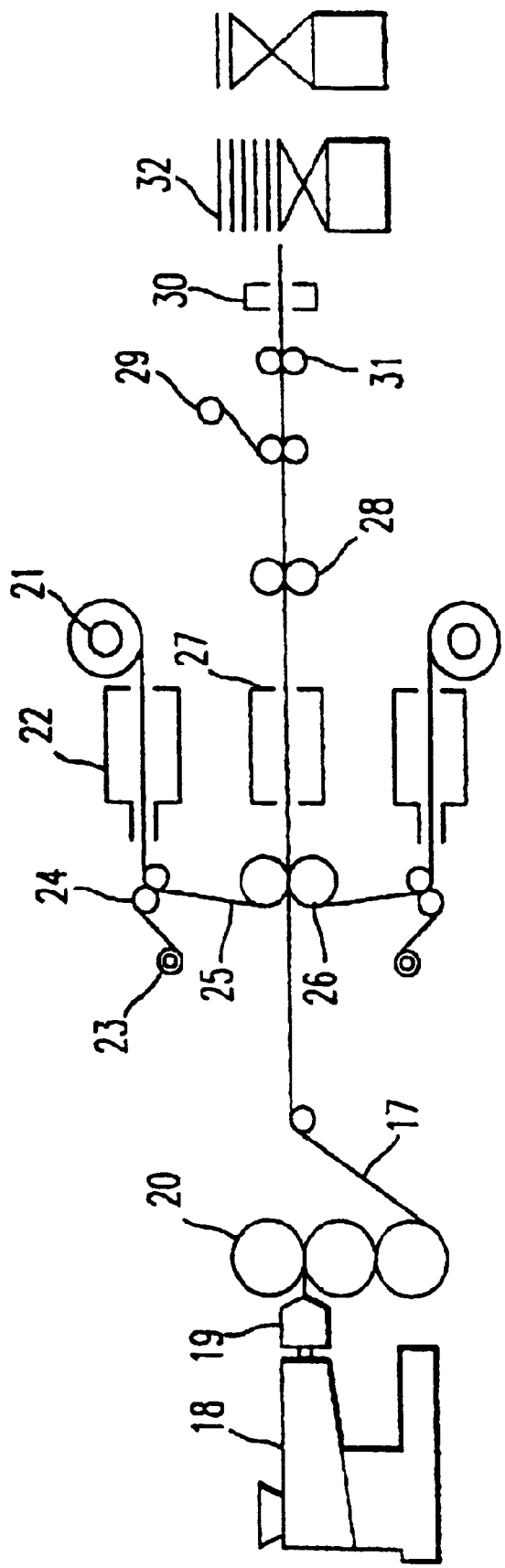
FIG. 4 illustrates an apparatus for forming composite laminates containing a coated metal plate according to the present invention.

FIG. 4 schematically illustrates an apparatus used for preparing the present metal-resin composite laminates. The structure and operation of the apparatus will be discussed in terms of forming a laminate in which the resin core is sandwiched between two coated metal sheets of the present invention. However, it is to be understood that either one of the present coated metal sheets may be omitted or replaced with any suitable replacement such as an uncoated metal sheet. The resin core (7) is extruded through an extruder (18) through a T-die (19) and passed through a sheeting three roll set (20). The coated metal sheet is uncoiled from an uncoiler (21) and preheated in a preheater (22). The adhesive film (23) and the preheated coated metal sheet are passed through prelaminating rollers (24) to give a metal sheet-adhesive film composite (25) and the extruded resin core (17) that are then passed through the laminating rolls (26) and on through the cooler (27), by means of pulling rollers (28). An optional, protective film (29) may be applied downstream of the pulling rollers (28).

The shears (29) downstream of the pulling rollers (28) are for cutting the laminate to desired length and are preferably flying shears. The laminate may be cut to width by means of the slitter (or trimmer) (30). The finished product is collected on a piler (32).

As noted above, the coated metal sheets and metal-resin composite laminates of the present invention possess a number of desirable characteristics. The present metal sheets and laminates may be bent to angles as sharp as 90° without cracking the coatings. The metal sheets may be bent as is, and the laminates may be bent after scoring or cutting the metal sheet along the line of bending on the acute side of the bend. Also, because the exterior surface of both the present metal sheets and laminates is a cured FEVE paint, it is possible to achieve surfaces having a mirrored finish with a reflective gloss greater than 99%.

In applying the high gloss coating compositions of this invention to untreated, bright, sealed, anodized metal, and particularly aluminum, substrates in coil form, it has been discovered that high heat conditions (peak metal temperatures) of about 380° F. (193° C.) or higher are important to the physical properties of the coating. Additionally, the higher peak metal temperatures result in shorter coating cure times and improve the non-yellowing properties of the high gloss coatings of this invention.

The high gloss coating compositions of this invention may be used for coating untreated, bright, sealed, anodized metal substrates, particularly such metal substrates in coil form, especially aluminum substrates and most especially, untreated, bright, sealed, anodized aluminum substrates in coil form. Although the high gloss coating compositions of this invention have been developed for coating untreated, bright, sealed, anodized metal substrates, particularly in coil form, it will be appreciated that such coating compositions may also be used, if desired, for coating metal substrates other than untreated, bright, sealed, anodized metal substrates. For example, said coating compositions can be employed for coating a wide variety of unsealed metal substrates or as protective coating over previously coated substrates.

The coil coating process is preferably conducted and employs high temperature conditions (PMT) of about 380° F. (193° C.) or higher, preferably at least about 400° F.–420° F. (216° C.) or above, and most preferably not higher than about 450° F. (232° C.).

The high gloss coatings on untreated, bright, sealed, anodized metal coil substrates obtained according to this invention are characterized by excellent properties. Such coil coated metal substrates are stable and exhibit essentially no hazing, clouding, flaking or delamination and pass a 5B rating when stability tested by being immersed for 1 hour at 180° F. (82° C.) in a 5% sodium chloride solution in distilled water, in accordance with the test of procedure described in ASTM D3359, Method B, with the cross-hatched cuts being spaced 1.5 mm apart and with the Scotchguard 610 tape peel test completed within about 90 seconds after removal from the salt solution. Said high gloss coated metal coil substrates also exhibit essentially no hazing, mottling or delamination at 2000 or more hours when QUV tested generally according to the procedures of ASTM G53 wherein the test sample is alternatively exposed to UV light (from about 270–340 nm) for eight hours at 70° C. and four hours of darkness at 100% relative humidity at 50° C.

Additionally, such high gloss coated metal coil substrates exhibit 99% or more reflectance. The coated coils slide and unroll easily and are substantially devoid of any problem with blocking or sticking. Such coated coil substrates are also characterized by excellent adhesion characteristics such that the coated metal coil substrates can be formed into desired parts of elements without delamination or cracking of the coated metal substrates. In fact, coated coil substrates have been subjected to 2T (two thicknesses) bending (three 180° bends) without showing evidence of cracking or delamination of the high gloss coating. Mar resistance of such coated coil substrates is excellent as is impact resistance of the coatings when subjected to an impact at 40 lbs/in$^2$ (28.124×10$^3$ kgs/m$^2$).

Other features of the invention will become apparent in the course of the following descriptions of exemplary embodiments which are given for illustration of the invention and are not intended to be limiting thereof.

EXAMPLES

In the following examples, and throughout this specification, all parts and percentages are by weight, and all temperatures are in degrees Celsius, unless expressly stated to be otherwise. Where the solids content of a dispersion or solution is reported, it expresses the weight of solids based on the total weight of the dispersion or solution, respectively. Where a molecular weight is specified, it is the molecular weight range ascribed to the product by the commercial supplier, which is identified. Generally this is believed to be weight average molecular weight.

Example 1

For the "bright highly reflective surface," the process begins with a chemical etch and optional polish achieved by dipping aluminum that was previously coiled, in an acidic bath followed by dipping in cleaning and rinse tanks. Transport takes place via a large conveyer system that begins with an unwinder and ends with an uptake spool. The coil is originally formed from an aluminum ingot that is then processed through a rolling mill followed by coiling by use of a take-up spool. The coiled aluminum is then uncoiled to achieve this working example.

After the chemically etching or "pre-treatment" is performed as the coil is fed through the process on the conveyer, the etched surface is then anodized in the conventional means by passing an electric current through an electrolyte bath in which the aluminum has been immersed. The anodized film then builds up on the same surface of the aluminum as the bright etch providing a hard and porous film. The coating thickness can be tightly controlled by varying current, process speed, temperature, etc.

After the anodizing step is completed, the aluminum is transported to the post-treatment section where optionally color is imparted by use of a pigment and the pores of the anodic film are sealed so that no further impregnation may occur. This "tinting" process is optional depending on the color or texture desired for the final product. Sealing is also optional, as it may be desirable to leave some pore sites open to allow for a different surface appearance.

Once bright etching, optional tinting and sealing are complete, the aluminum is then recoiled and clear coated with a Lumiflon resin (as previously described). It is also possible to perform this coating operation prior to recoiling.

Examples 2–4

The identical processing description may be carried out, with the following exceptions (or changes) to the process;

2. A textured cross pattern may be substituted for bright etching, followed by optional tinting/non-tinting and sealing/non-sealing.
3. A mechanically brushed pattern may be substituted for bright etching, followed by optional tinting/non-tinting and sealing/non-sealing.
4. A clear anodized surface appearance may be substituted for bright etching, followed by optional tinting/non-tinting and sealing/non-sealing.

Measurement of Product Gloss

High gloss of the product is determined by reflectivity measurements and image clarity of the reflected image as an indication of the surface appearance, using a Dorigon II, Technidyne TR2, REFO 3 or similar device that measures the percent of light reflected off a metal sample at a specified angle (typically 45 degrees). Some of these devices include an internal mirrored sphere that allows for measurement of light reflected back to a specific portion of the mirrored sphere such that the angle of reflectance can be precisely determined. A "perfect mirror" will reflect 99.99% of the light with only a slight amount of light scattering. All reflective surfaces are compared to that perfect mirror, with the "premirror" surface of the present invention preferably yielding a value of at least 87%. In addition, distinctness of the image is measured with the perfect reflection mirror value of 100 used as a comparison. The distinctness of image value for the "premirror" surface of the present invention is preferably at least 98.

Standardization of the instrument used is normally accomplished by using several surfaces including: a surface mirror standard, a black glass standard and a diffuse aluminum standard with a 15 degree haze. These surfaces are used to calibrate the photometer so that proper comparison measurements can be made. A calibration check must be performed after an initial warm-up period of 20 minutes. Calibration results are checked against a value that is listed on the back of each standard sample as stated by the manufacturer.

For panels with aluminum surfaces such as those of preferred embodiments of the present invention, measurements are taken at three locations: inner edge, center and outer edge. The instrument is placed directly on the panel with the port (for the light source) positioned toward the area to be measured. The display screen is aligned parallel to the grain direction of the aluminum panel and a measurement is made. The instrument is then rotated 90 degrees, against the grain direction, and a second measurement is made. This procedure is repeated at least three times at each section of the panel (inner edge, center and outer edge). Both reflectivity and distinctness of image is recorded and stored in an appropriate database.

Obviously, numerous modifications and variations of the present invention are possible in light of the above teachings. It is therefore to be understood that, within the scope of the appended claims, the invention may be practiced otherwise than as specifically described herein.

All patents and other references mentioned above are incorporated in full herein by this reference, the same as if set forth at length.

What is claimed is:

1. A coated metal article, comprising:
   (a) a metal substrate with a surface; and
   (b) a layer of a cured fluorinated ethylene vinyl ether paint on said surface,
wherein said layer of cured fluorinated ethylene vinyl ether paint is formed by coating said surface with a coating composition which comprises:
   (a') a fluorinated ethylene vinyl ether;
   (b') a curing agent;
   (c') a catalyst; and
   (d') a solvent,
and curing said coating composition.

2. The metal article of claim 1, wherein said metal substrate is an untreated, bright, sealed, anodized metal sheet.

3. The metal article of claim 1, wherein said metal substrate is an untreated, bright, sealed, anodized aluminum sheet.

4. The metal article of claim 1, wherein said metal article has a reflective rating of at least 87%.

5. A metal-resin composite laminate comprising:
   (A) a resin sheet; and
   (B) a first metal sheet laminated on a first surface of said resin sheet;
wherein said first metal sheet is a coated metal sheet comprising:

(a) a metal substrate with an interior and exterior surface; and (b) a layer of a cured fluorinated ethylene vinyl ether paint on said exterior surface opposite said resin sheet, wherein said layer of cured fluorinated ethylene vinyl ether paint is formed by coating said exterior surface with a coating composition which comprises:
(a') a fluorinated ethylene vinyl ether;
(b') a curing agent;
(c') a catalyst; and
(d') a solvent,
and curing said coating composition.

6. The metal-resin composite laminate of claim 5, further comprising:
(C) a second metal sheet laminated to a second surface of said resin sheet.

7. The metal-resin composite laminate of claim 5, wherein said metal substrate is an untreated, bright, sealed, anodized metal sheet.

8. The metal-resin composite laminate of claim 5, wherein said metal substrate is an untreated, bright, sealed, anodized aluminum sheet.

9. The metal-resin composite laminate of claim 5, wherein said exterior metal substrate surface opposite said resin sheet has a reflective rating of at least 87%.

10. The metal-resin composite laminate of claim 5, wherein said metal substrate has a thickness of 0.01 to 2 mm.

11. The metal-resin composite laminate of claim 5, wherein said layer of cured fluorinated ethyl vinyl ether paint has a thickness of 1 to 40 um.

12. The metal-resin composite laminate of claim 5, wherein said resin sheet has a thickness of 1 to 10 mm.

13. The metal-resin composite laminate of claim 5, wherein said resin sheet comprises a resin selected from the group consisting of polyethylene, polypropylene, polybutene, polyvinyl chloride, polystyrene, polyamide, polyethylene terephthalate, polybutylene terephthalate, and polycarbonate.

14. The metal-resin composite laminate of claim 5, wherein said resin sheet comprises polyethylene.

15. The metal-resin composite laminate of claim 5, wherein said resin sheet further comprises 0.05% to 0.4% of carbon black, based on the total weight of said resin sheet.

16. A method for preparing a coated metal article, comprising:
(a) a metal substrate with a surface; and
(b) a layer of a cured fluorinated ethylene vinyl ether paint on said surface,
said method comprising:
(1) coating said surface with a coating composition which comprises:
(a') a fluorinated ethylene vinyl ether;
(b') a curing agent;
(c') a catalyst; and
(d') a solvent, to obtain an uncured coating layer and
(2) curing said uncured coating layer.

17. The method of claim 16, wherein said metal substrate is an untreated, bright, sealed, anodized metal sheet.

18. The method of claim 16, wherein said metal substrate is an untreated, bright, sealed, anodized aluminum sheet.

19. The method of claim 16, wherein said curing is carried out by heating at a temperature of 380° F.

20. A method for preparing a metal-resin composite laminate comprising:
(1) forming a layer of a coating composition on a surface of a first metal sheet; and
(2) curing said layer of said coating composition, to obtain a coated metal sheet; and
(3) laminating said coated metal sheet to a first surface of a resin sheet,
wherein said coating composition comprises:
(a') a fluorinated ethylene vinyl ether;
(b') a curing agent;
(c') a catalyst; and
(d') a solvent.

21. The method of claim 20, wherein said metal sheet is an untreated, bright, sealed, anodized metal sheet.

22. The method of claim 20, wherein said metal sheet is an untreated, bright, sealed, anodized aluminum sheet.

23. The method of claim 20, wherein said curing is carried out by heating at a temperature of 380° F.

24. The method of claim 20, further comprising:
(4) laminating a second metal sheet to a second surface of said resin sheet.

25. The method of claim 20, wherein said first metal sheet is an untreated, bright, sealed, anodized metal sheet.

26. The method of claim 20, wherein said first metal sheet is an untreated, bright, sealed, anodized aluminum sheet.

27. The method of claim 20, wherein said first metal sheet has a thickness of 0.01 to 2 mm.

28. The method of claim 20, wherein said resin sheet has a thickness of 1 to 10 mm.

29. The method of claim 20, wherein said resin sheet comprises a resin selected from the group consisting of polyethylene, polypropylene, polybutene, polyvinyl chloride, polystyrene, polyamide, polyethylene terephthalate, polybutylene terephthalate, and polycarbonate.

30. The method of claim 20, wherein said resin sheet comprises polyethylene.

31. The method of claim 20, wherein said resin sheet further comprises 0.05% to 0.4% of carbon black, based on the total weight of said resin sheet.

* * * * *

UNITED STATES PATENT AND TRADEMARK OFFICE
CERTIFICATE OF CORRECTION

PATENT NO.    : 6,365,276 B1
DATED         : April 2, 2002
INVENTOR(S)   : Rudisi et al.

It is certified that error appears in the above-identified patent and that said Letters Patent is hereby corrected as shown below:

<u>Title page, Item [54] and Column 1, lines 1-5,</u>
The Title should read -- [54] COATED METAL ARTICLES, METHODS FOR PREPARING THE SAME, LAMINATED COMPOSITES CONTAINING THE SAME, AND METHODS FOR PREPARING SUCH LAMINATED COMPOSITES --

Item [75], the Inventors should read as follows:
-- [75] Inventors: Joseph J. Rudisi, Virginia Beach; Richard N. Harford;
Frederick L. Chapman, both of Chesapeake; Hari Menon, Yorktown, all of VA (US);
Tetsu Sonoda, Joetsu (JP); David J. Kearney, Newport News (VA) --

Item [73], the Assignee should read as follows:
-- [73] Assignee: Mitsubishi Chemical America, Inc.,
                  Chesapeake, VA (US) --

Signed and Sealed this

Twelfth Day of November, 2002

*Attest:*

*Attesting Officer*

JAMES E. ROGAN
*Director of the United States Patent and Trademark Office*